Jan. 19, 1926.
N. H. FOOKS
1,570,236
PROCESS OF COOKING AND COOLING
Filed Feb. 12, 1925
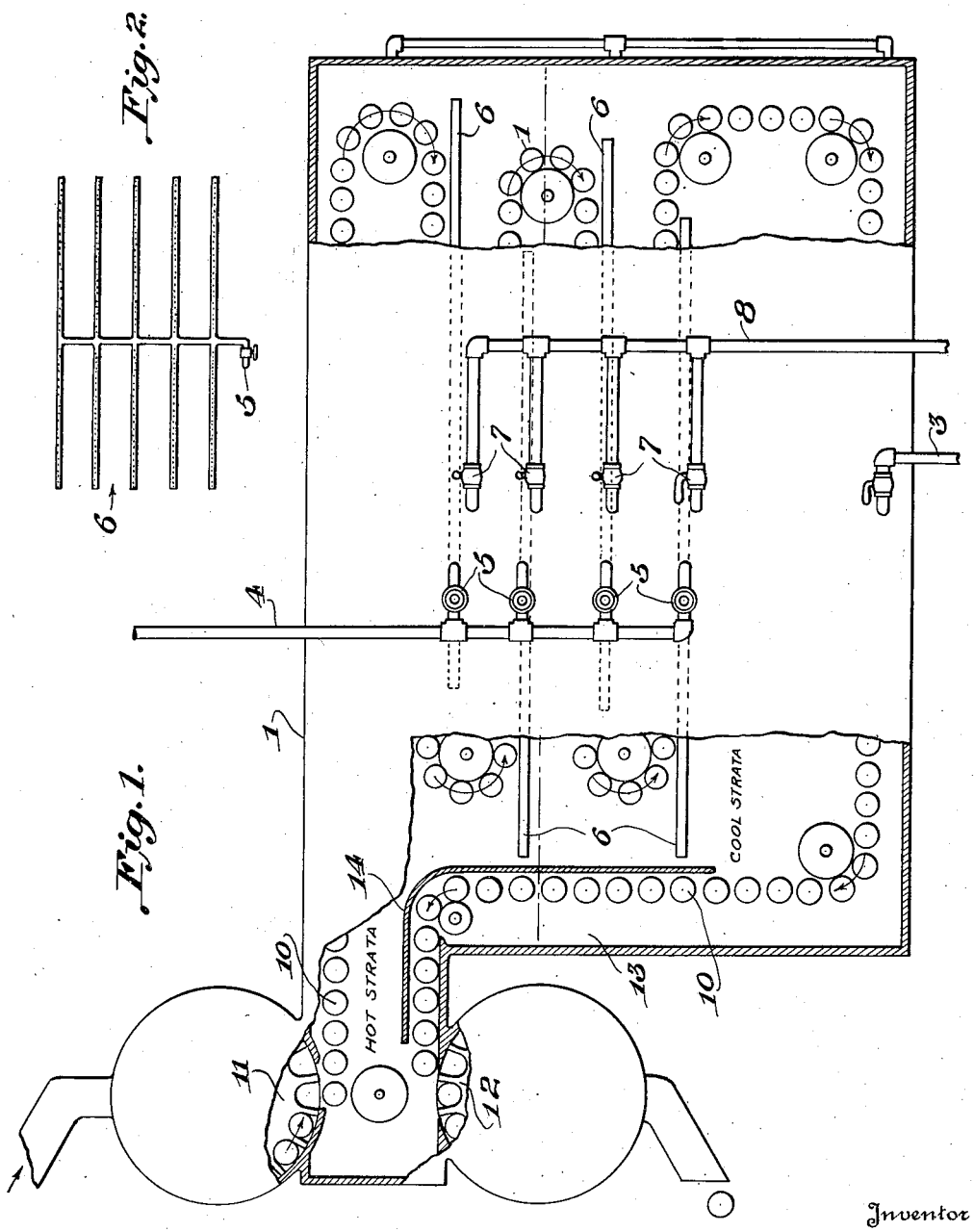
Inventor
Nelson H. Fooks.

Patented Jan. 19, 1926.

1,570,236

UNITED STATES PATENT OFFICE.

NELSON H. FOOKS, OF PRESTON, MARYLAND.

PROCESS OF COOKING AND COOLING.

Application filed February 12, 1925. Serial No. 8,842.

*To all whom it may concern:*

Be it known that I, NELSON H. FOOKS, a citizen of the United States, residing at Preston, in the county of Caroline and State of Maryland, have invented certain new and useful Improvements in Processes of Cooking and Cooling; and I do hereby declare the following to be a full, clear, and exact description of the invention, such as will enable others skilled in the art to which it appertains to make and use the same.

This invention has for its object the provision of an improved method of heat treating substances, and more particularly foods in sealed receptacles, such as tin cans, whereby the cans may be subjected to cooking temperature for any desired period, and then subjected to a lower cooling temperature while at the same time maintaining substantially the same external pressure upon the containers, whereby the internal pressure will be reduced substantially to normal before the discharge of the cans into the atmosphere, thus avoiding rupture of the containers.

Heretofore various processes have been suggested having this object in view, but the present invention is adapted to accomplish the objects in mind with the utmost simplicity and with very simple apparatus.

The present invention utilizes the well known physical law that heat applied to a fluid tends to expand the fluid, thus decreasing its specific gravity immediately adjacent the source of heat and inaugurating an upward current in the fluid, the lighter, heated portions of the fluid ascending while the cooler portions of the fluid at the top sink to replace that which has risen. The current thus set up extends only from the source of heat in the fluid to the surface thereof, while so much of the fluid as is below the source of heat remains free from such currents, and by reason of the fact that fluids are relatively poor conductors of heat, that portion of the fluid below the source of heat remains at substantially the original temperature.

In accordance with this invention, therefore, it is proposed to use a fluid such as water in a suitable receptacle and to apply heat to the water intermediate the upper surface of the water and the bottom of the container as may be desired, which application of heat will cause the water above the source of heat to become heated and remain so heated as long as the heat is supplied, while so much of the water as is below the source of heat will remain relatively cool. By passing the sealed receptacles, containing the substance to be cooked, successively through the upper and heated strata of the fluid and thence into and through the lower or cool strata, it will be apparent that the substance in the receptacles will be first cooked and then cooled, and furthermore that the relative periods of cooking and cooling can be varied and regulated with great simplicity and accuracy by varying the relative depths of the heated strata and the cool strata of the fluid, and also by regulating the time periods during which the receptacles are retained in the respective stratas, which latter control may be modified as desired either by varying the path of the receptacles through the stratas or by regulating the speed with which the receptacles are advanced.

For purpose of illustration, the accompanying drawing shows:—

Fig. 1 is a part sectional and part diagrammatic elevation of a cooker and cooler in conjunction with which my improved process may be practiced.

Fig. 2 is a bottom plan view of one group of pipes through which the heating medium is admitted into the apparatus shown in Fig. 1.

In the drawing, Figure 1 indicates generally a retort or tank having a cold water supply pipe 3, and a pipe or conduit 4 for supplying the heating medium to the retort said pipe having valved lateral extensions 5, each in connection with a group of horizontally disposed pipes generally indicated at 6. The tank is filled with a suitable fluid such as water, and by admitting the heating medium such as steam to one or more of the groups of pipes 6, the depth of the upper or heated strata of the water and the lower or cool strata of the water may be regulated as desired. To avoid the slow increase in heat of the lower or cooling strata of the water by conduction, a series of valved water outlets indicated generally by 7 are provided at different levels corresponding with the groups of heating pipes 6, so cool water may be caused to flow from the inlet pipe 3 at the bottom of the cool strata to near the bottom of the heated strata and thence outward if desired.

The retort or tank is provided with any suitable form of can conveying means which will permit the cans to be moved from one level to another in the tank through the heating and cooling stratas of the fluid. For simplicity of showing no specific can moving means is shown, but only the path which the cans will follow in their progress through the tank, such path being indicated at 10 by a line of cans. If desired, the cans may be entered into the retort or tank through a rotary valve 11 and be discharged therefrom by a similar valve 12, but the present invention is equally applicable to open retorts in connection with which, of course, there will be no occasion for such valves. In the present showing of cooker and cooler, the cans after passing through the cooling strata at the bottom of the tank are shown as passing upwardly through a well 13 formed by a partition 14 and thence outwardly through the discharge valve 12.

My present invention, however, is not restricted to any particular type of cooker, and any apparatus adapted to contain water and to have heat admitted to the water intermediate the top and bottom thereof may be utilized in connection with suitable means for passing the cans through the respective heating and cooling stratas.

Having thus described my invention, I claim:—

1. The process of cooking and cooling substances in sealed receptacles which consists in passing the receptacles through a fluid, said fluid having an upper heated strata and a lower relatively cooler strata, said receptacles being advanced from the heated strata into the cooler strata.

2. The process of cooking and cooling substances in sealed receptacles which consists in passing the receptacles through a fluid, said fluid having an upper heated strata and a lower relatively cooler strata, said receptacles being advanced from the upper to the lower stratas and varying the cooking and cooling periods as desired, by varying the relative depths of said heated and cooler stratas.

3. The process of cooking and cooling substances in sealed receptacles which consists of passing the receptacles through a fluid, said fluid having an upper heated strata and a lower cooler strata, said receptacles being advanced from the upper to the lower stratas and varying the cooking and cooling periods as desired, by varying the time periods during which the receptacles are retained in the respective stratas.

4. The process of cooking and cooling substances in sealed receptacles which consists of passing the receptacles through a fluid, said fluid having an upper heated strata and a lower cooler strata, said receptacles being advanced from the upper to the lower stratas and varying the cooking and cooling periods as desired, by varying the relative depths of said heated and cooled stratas, and modifying the time periods during which the receptacles are retained in the respective stratas.

In testimony whereof I affix my signature.

NELSON H. FOOKS.